United States Patent [19]
Ketchpel, Jr. et al.

[11] 3,774,302
[45] Nov. 27, 1973

[54] POWER DRIVEN GRASS SHEAR

[75] Inventors: Paul A. Ketchpel, Jr., Simsbury; Carl C. Stoutenberg, Avon; Edward J. Johnson, New Britain, all of Conn.

[73] Assignee: The Stanley Works, New Britain, Conn.

[22] Filed: Jan. 4, 1972

[21] Appl. No.: 215,358

[52] U.S. Cl................ 30/210, 30/216, 30/218, 30/222, 30/233, 30/236, 30/247
[51] Int. Cl............................................ B26b 19/12
[58] Field of Search.................. 30/197, 210, 216, 30/217, 218, 219, 221, 222, 223, 224, 228, 233, 233.5, 236, 247; 56/246

[56] References Cited
UNITED STATES PATENTS

| 1,584,459 | 5/1926 | Link | 30/222 |
| 631,016 | 8/1899 | Klugel | 30/221 |
| 3,049,802 | 8/1962 | Bork | 56/246 X |
| 2,652,626 | 9/1953 | Dutcher | 30/228 |
| 3,589,007 | 6/1971 | Walton | 30/210 |

Primary Examiner—Othell M. Simpson
Assistant Examiner—Mark S. Bicks
Attorney—Peter L. Costas

[57] ABSTRACT

A shear for grass and the like includes a tooth plate on which is pivotally mounted a plurality of shearing members, each including a narrow and resiliently deformable blade element. The blade elements extend outwardly along the upper surface of the tooth plate, and each oscillates across one of the cutting recesses that are defined between adjacent teeth at one end of the plate. The outer ends of the blade elements are biased toward the tooth plate causing substantially point contact to exist between the cutting edges of the blade element and the side edges of the teeth as the blade elements wipe thereover. Preferably, the shear is power driven, and most desirably energy is supplied by a battery housed within the body thereof.

17 Claims, 8 Drawing Figures

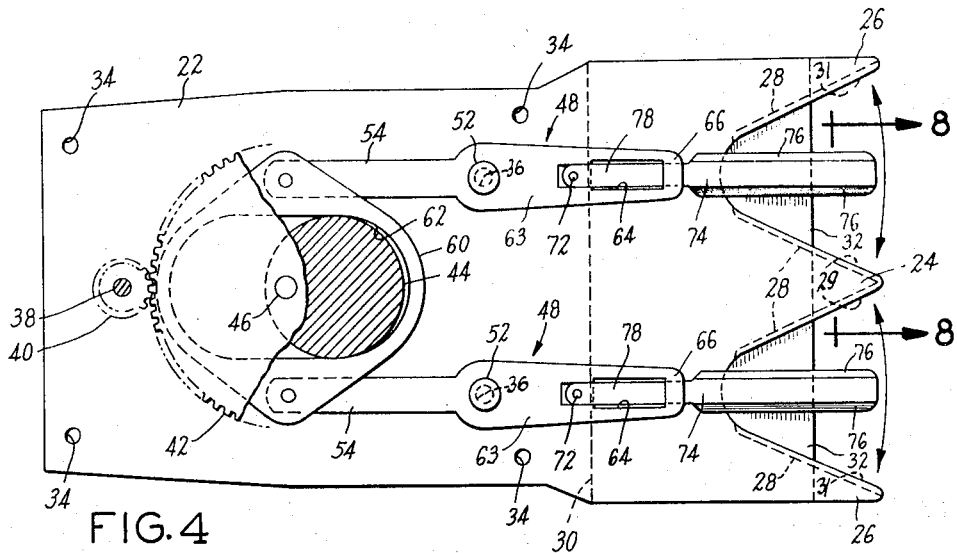
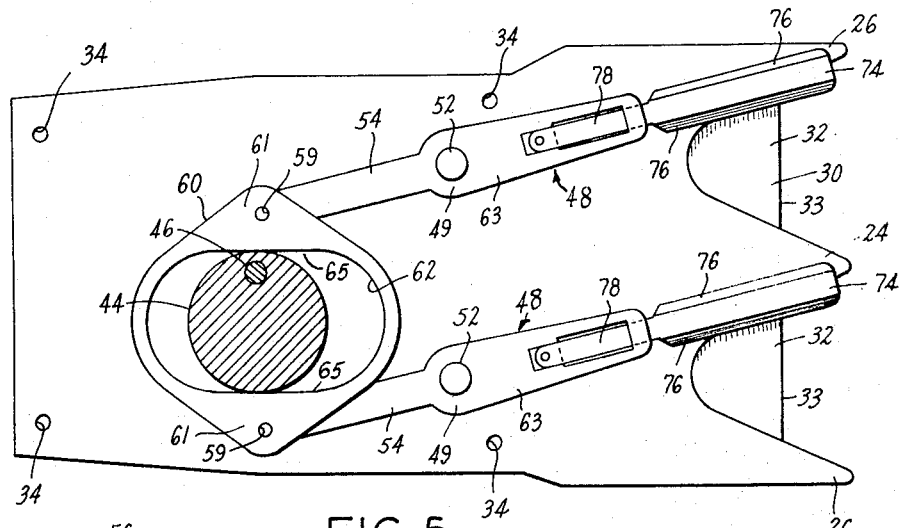
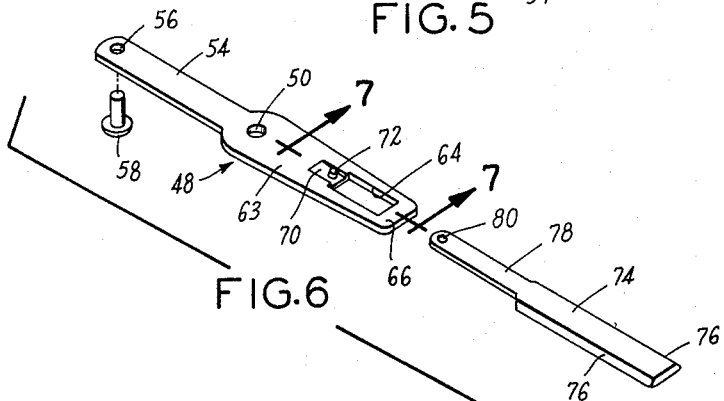
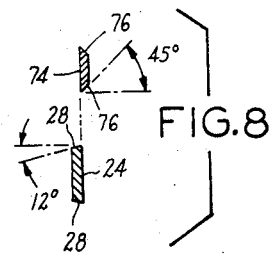
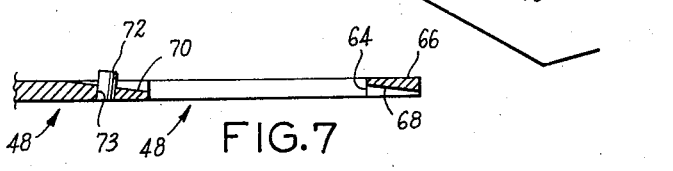

POWER DRIVEN GRASS SHEAR

BACKGROUND OF THE INVENTION

Power driven grass shears, hedge trimmers and similar tools of the prior art have typically employed moving parts or relatively large mass and have been designed with rather extensive areas of contact between shearing elements. These factors, which in many cases are augmented by the biasing of parts with separate springs and the like to improve the shearing effect, are responsible for creating considerable levels of drag or frictional resistance to movement in such tools. In addition to functional resistance, inertia is another significant factor in the power requirements for operation. These and other factors are especially significant in devices of this sort that are designed for battery power operation because the weight added by the battery will generally be proportional to the energy demands of the tool.

Sharpening or reconditioning of the blades of such prior art tools is often difficult and inconvenient because of the extent to which the tool must be disassembled for removal of the blade. Moreover, the rather complex configuration that is typical of such blades makes it quite difficult to create or sharpen the cutting edges by a hollow grinding or similar conventional technique, and the cost of replacing such a blade after it has worn out may often be prohibitive.

Accordingly, it is an object of the present invention to provide a novel shear for grass and the like which operates highly efficiently with relatively low power, which employs moving parts that are relatively light weight and few in number, and which is relatively simple and inexpensive to manufacture.

A more specific object of the invention is to provide such a novel shear in which frictional resistance and inertia are minimized.

Another object is to provide a shear of the foregoing type in which vibration is minimized and safety is maximized by virtue of a low stall torque characteristic.

Still another object is to provide such a shear in which the blade elements employed are relatively inexpensive and are readily removed for replacement or reconditioning.

A further object is to provide a novel power driven shear having all of the foregoing features and advantages and designed for self-contained battery-powered operation.

SUMMARY OF THE DISCLOSURE

It has now been found that the foregoing and related objects of the invention may be readily attained in a shear including a generally planar tooth plate and a plurality of shearing members, the tooth plate having at one end thereof a multiplicity of tooth formations defining generally U-shaped cutting recesses therebetween. Each of the shearing members has a relatively narrow and resiliently deformable blade element extending outwardly along the upper surface of the end of the tooth plate, and each of the blade elements has cutting edges extending along both side margins of the outer end portion thereof. The shearing members are pivotally mounted in the shear inwardly from the "one" end of the tooth plate for movement across one of the cutting recesses. The outer end portions of the blade elements are resiliently biased against the upper surface of the tooth plate, and each is oscillatable across the aligned cutting recess with the cutting edges thereof wiping the side edges of the tooth formations defining the recess. Drive means oscillates the shearing members upon the tooth plate, with the bias thereof tending to urge the outer portions of the blade elements through the cutting recesses. This causes substantially point contact to occur between the cutting edges and the side edges of the blade elements wipe the tooth formations in a scissors-like fashion.

The shearing members are preferably independently mounted. Most desirably, they are mounted on the tooth plate to oscillate in a substantially parallel relationship to one another with the point of pivotal mounting for each of the shearing members advantageously being in substantial alignment with the axis of the cutting recess across which it moves. The points of attachment of the shearing members to the drive means may be spaced above the upper surface of the tooth plate to elevate the shearing members thereabove. This will tend to minimize the area of contact between the tooth plate and the shearing members and will enhance the shearing effect of the cutting edges of the blade elements.

Preferably, each of the shearing members comprises a blade carrier which is pivotally mounted upon the tooth plate, and an independent blade element disengageably supported thereby. The blade carrier may desirably be elongated with means adjacent one end for engaging the independent blade element. Both the carrier and also the blade element may be substantially rectilinear, and the carrier may be mounted upon the tooth plate with the axis thereof substantially parallel to the upper surface of the plate and with the engaging means supporting the blade element at an angle to the carrier, thus disposing the blade element downwardly therefrom toward the tooth plate. Most desirably, the "one" end of the carrier will have a slot extending therethrough with a tang portion adjacent one end of the independent blade element being inserted upwardly through the slot and retained therein to engage and dispose the blade element as described. A pin may be affixed on either the carrier or the tang of the blade element and secured in an aperture provided in the other one thereof. The pin may be disposed with its axis substantially perpendicular to the axis of the blade element, with the bias of the shear member urging the pin into the aperture to prevent inadvertent disassembly thereof.

The shear may additionally include a sole plate element extending along the lower surface of the tooth plate and substantially across the tooth plate adjacent the inner ends of the tooth formations to space the tooth formations upwardly from surfaces over which the shear is operated. This will prevent excessive wear and damage to the tooth formations due to contact therewith. Preferably, the sole plate element will underlie the inner end portions of the recesses between the tooth formations and will provide web portions having edge surfaces extending transversely therebetween. The web portions reduce the effective depth of the tooth formations and blade elements exposed for cutting and support the blade elements during oscillation between the side edges of the tooth formations, thereby facilitating movement thereof.

In the preferred embodiments of the invention the drive means for the shear includes an electric motor to render it power driven, and most desirably a battery to provide energy for the motor is additionally included. The drive means may also include a gear in driven engagement with the motor and having an axially projecting cam element eccentrically disposed on one side thereof. in such a case, the drive means will additionally include a cam follower member having a cam surface extending parallel to the cam element of the driven gear for contact therewith, and configured to impart oscillatory movement to the follower movement upon rotation of the gear with the cam element contacting the cam surface. With the shearing members pivotally connected to the cam follower member, contact of the cam element on the cam surface translates rotary motion of the gear to oscillatory movement of the follower member in a substantially parallel plane, the follower member in turn imparting oscillation to the shearing members. Preferably, the follower member has an elongated opening therein providing the cam surface, the opening having its longitudinal axis substantially parallel to the direction of extension of the tooth formations of the tooth plate. Most desirably, the cam element has a generally circular transverse cross sectional configuration and the opening of the follower member has substantially rectilinear side margins, such margins extending parallel to the longitudinal axis of the opening and spaced therefrom a distance substantially equal to the radius of the cam element.

In most instances, the shear will include a housing which may enclose the motor as well as a battery. In such a case the tooth plate may extend outwardly from one end of the housing and the housing may have a handle portion extending from the other end thereof in a direction generally opposite to that in which the tooth plate extends.

BRIEF DESCRIPTION OF THE DRAWINGS

FIG. 4 is a sectional view of the shear along the line 4—4 of FIG. 2, with the drive gear broken away to show the associated eccentric lobe and with the parallel cutting blades in a neutral position;

FIG. 5 is a sectional view along the line 5—5 of FIG. 2, with the eccentric lobe displaced by a quarter revolution of the drive gear from its position in FIG. 4 and with the blades shifted thereby to a position at the end of a cutting stroke in one direction during the cycle of operation;

FIG. 6 is an exploded perspective view of the shearing member assembly provided by the cutting blade and carrier illustrated in previous figures;

FIG. 7 is a sectional view of the forward end portion of the carrier along the line 7—7 of FIG. 6 drawn to a further enlarged scale; and FIG. 8 is a sectional view of one of the blades and the center tooth of the tooth plate along the line 8—8 of FIG. 6 and illustrating the cross sectional configurations thereof.

DETAILED DESCRIPTION OF THE ILLUSTRATED EMBODIMENT

Figure 1:
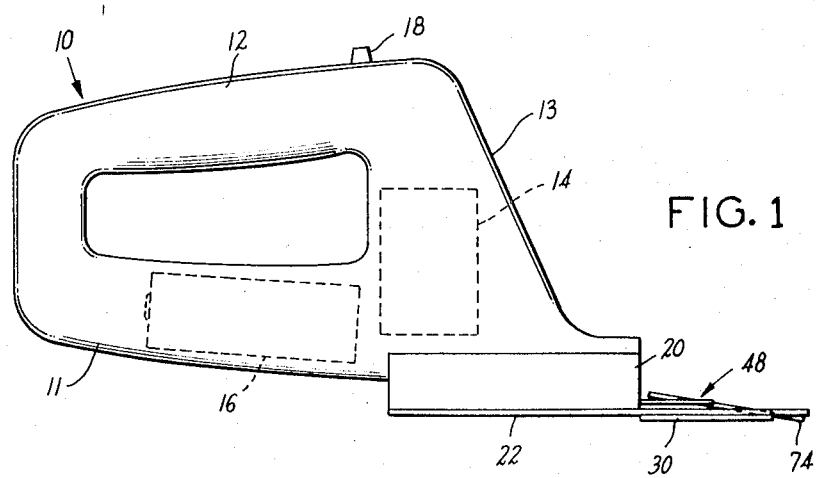
FIG. 1 of the drawings is a side elevational view of a power driven shear embodying the present invention.

Turning now in detail to the appended drawings, therein illustrated is a power driven grass shear embodying the present invention and including a molded housing generally designated by the numeral 10 and having a hand grip portion 12, a body portion 13 and a grip reinforcing portion 11. The body portion 13 encloses an electric motor 14 and the reinforcing portion 11 encloses a rechargeable battery 16 and recharging means (not shown). The motor 14 and battery 16 are electrically interconnected by conventional means with a switch 18 (only the toggle of which is illustrated) being provided in the circuit to control operation of the shear. A housing block or shoe 20 is provided at the lower end of the body portion 13, and a tooth plate or comb 22 extends along the lower surface of the block 20, forwardly and outwardly from the housing 10. The housing block 20 is configured to accommodate and enclose various parts of the shear.

As may best be seen in FIGS. 4 and 5, the tooth plate 22 has a tridentate forward configuration with a symmetrical pointed center tooth 24 and with teeth 26 spaced to either side thereof. The center tooth 24 has a bevelled face 28 along the underside of each of its two side margins providing cutting edges thereat, and each of the side teeth 26 has a similar face 28 along the underside of its inner side margin to provide comparable cutting edges 31 thereon. The edges 29,31 of adjacent teeth 26,24 respectively converge inwardly and in part define cutting recesses therebetween.

Fixed against the underside of the tooth plate 22, by welding or other means, is a sole plate 30 which extends transversely across the forward portion of the tooth plate 22 and provides web portions 32 between the teeth 24,26 thereof. In general, the sole plate 30 serves to minimize wear and damage from contact that would otherwise occur on surfaces over which the shear is operated; however, it will be appreciated that the forward edges 33 thereof cooperate with the edges 29,31 of the teeth 24,26 in defining the cutting recesses therebetween. At four locations about the periphery of the tooth plate 22 mounting apertures 34 are provided, and a pair of pivot post apertures 36 are also formed therethrough to permit mounting of the dual cutting mechanism of the shear.

Figure 2:
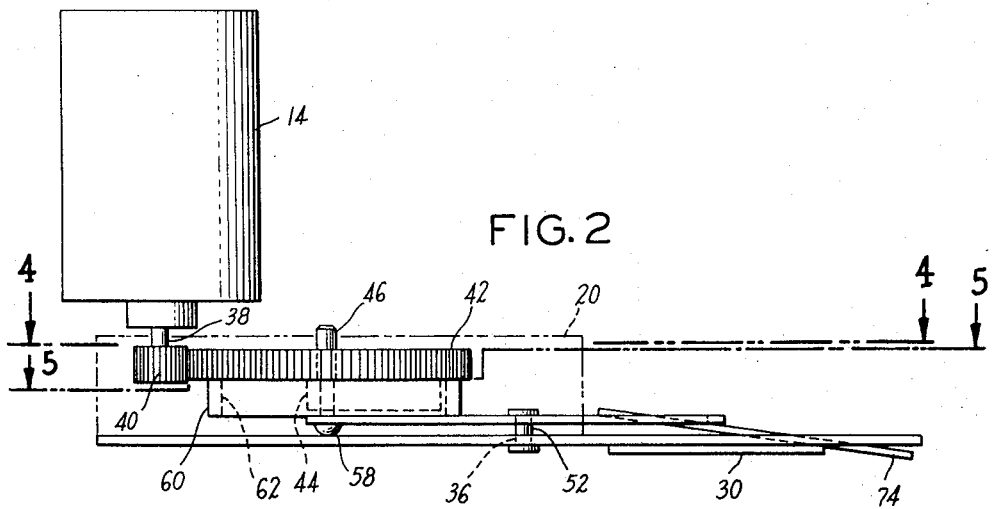
FIG. 2 is a side elevational view of the operating components in the forward portion of the shear of FIG. 1 drawn to an enlarged scale.
Figure 3:
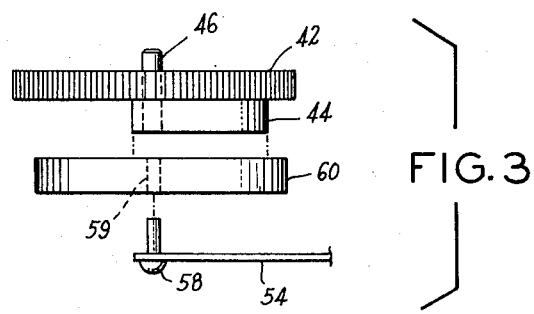
FIG. 3 is an exploded side elevational view of the gear and cam mechanism providing oscillatory motion to the cutting blades of the shear.

Extending from the motor 14 is a vertical shaft 38 with a drive pinion 40 which meshes with a relatively large driven gear 42, at the underside of which is affixed or integrally formed an eccentric lobe or cam 44. The gear 42 and lobe 44 are mounted upon a vertical shaft 46, which is journalled in an aperture in the block 20 (as is seen in FIG. 2).

Each of a pair of elongated and relatively narrow blade carriers generally designated by the numeral 48 is pivotally mounted upon a double-headed rivet or pivot post 52, the rivets pass through pivot apertures 50 in the central portion 49 of the carriers 48 and through the pivot post apertures 36 in the tooth plate 22 to mount the carriers 48 thereon. Since each of the carriers 48 is of identical construction, only one of them need be described in detail hereinafter.

An axial inner arm portion 54 extends outwardly from the central portion 49 of the carrier 48 and has a pivot aperture 56 at its end. A pivot member 58 passes upwardly through the pivot aperture 56 and is engaged in the aperture 59 in one of the ear portions 61 of the yoke or cam follower 60, the pivot members 58 being pivotably seated in one or both members to permit relative pivoting to occur between the yoke 60 and the carriers 48 attached thereto. Since the spacing between the pivot post 52 and between the apertures 59 in the ear portions 61 is substantially equal, the two shearing members will oscillate in general parallelism, as is seen in FIGS. 4 and 5. The yoke 60 has a central opening 62 of generally oval configuration, in which is seated the lobe 44 present on the underside of the drive gear 42. The opening 62 is defined by parallel rectilinear side surfaces 65, and is of a length which is adequate to accommodate the lobe 44 in either the position shown in FIG. 4 or in the diametrically opposed position which would result from rotation of the gear 42 through an angle of 180 degrees therefrom. As can be seen, the spacing between the surfaces 65 is substantially equal to the diameter of the lobe 44 to achieve a close fit, which will ensure smooth operation and will minimize chatter.

In the slightly tapered forward arm portion 63 of the carrier 48 is a rectangular axially elongated slot 64 which is defined at its forward end by the bridge portion 66 at the outer end of the carrier 48. As is best seen in FIG. 7, the underside of the bridge portion 66 has a downwardly and forwardly sloping channel 68 of generally U-shaped transverse cross section, which leads into the forward end of the rectangular slot 64. A similar channel 70 of generally U-shaped cross section is provided in the upper surface of the carrier 48 and slopes upwardly and inwardly from the rear of the rectangular slot 64 at substantially the same angle of incline as the channel 68. A short tilted pin 72 is seated in an aperture 73 of the carrier 48 and extends upwardly from the sloping floor of the channel 70 at an angle of about 90 degrees thereto. The channels 68,70 are dimensioned and configured to receive therein, in close-fitting engagement along its sides, the elongated tang 78 of a cutting blade 74, which is slightly narrower than the slot 64 of the carrier 48 to provide clearance for facility of assembly and disassembly.

As can be seen from the drawings, the blade 74 is assembled with the carrier 48 by inserting the tang 78 thereof upwardly through the slot 64 and with the tilted pin 72 is engaged in the aperture 80 in the inner end thereof. This positions the blade 74 at a slight downward angle to the axis of the carrier 48 and, since the carrier 48 extends generally parallel to the plane of the tooth plate 22, the blade 74 also extends downwardly relative thereto. As seen in FIG. 8, the cutting faces 76 along each side margin of the forward portion of the blades 74 are typically ground, conveniently at an angle of about 45 degrees, and the cutting edges defined thereby cooperate with the cutting edges 29,31 of the teeth 24,26 in a manner more fully described hereinafter, the faces 28 of the teeth 24,26 typically being provided with a 12 degree bevel.

In operation, the motor 14 rotates the pinion 48 which is rigidly affixed to the shaft 38 thereof; meshing engagement of the pinion 40 rotates the driven gear 42 which, in turn, moves the lobe 44 in a circular path about the shaft 46. This movement shifts the yoke 60 back and forth across the rear portion of the tooth plate 22, causing the two blade carriers 48 to pivot about the rivets or pivot posts 52, in turn oscillating the blades 74 within the cutting recesses defined by the teeth 24,26 and the web portions 32. In FIG. 4, the blades 74 are in small area contact with the edges of the tooth plate 22 at the inner end of the cutting recesses. As the mechanism is shifted to the position shown in FIG. 5, the blades 74 move across these edges and then encounter the edges 31,29 of the teeth 24,26 where the forward edge moves therealong in a substantially point contact relationship. High levels of shear force are thereby developed between the cutting edges defined by the teeth 24,26 and the blades 74, causing clean and highly efficient shearing of blades of grass present therebetween. The sole plate 30 provides clearance for the blades 74 and affords additional protection by minimizing the exposed tooth depth.

As can best be seen in FIG. 2, the construction of the present shear results in a minimum amount of contact between the relatively moving parts thereof. Thus, due to the downward bias of the blades 74, frictional resistance to oscillation is present at only the line or point of contact with the edges of the tooth plate 22 at the inner end of the cutting recesses and with the cutting edges 28 of the teeth 24,26. The only other points of contact for the oscillating cutter assembly, comprised of a carrier 48 and blade 74, are at the head of the pivot member 58 and at the pivot post 52. This is in contrast to comparable prior art devices in which contact normally occurs over most of one surface of a relatively large movable cutting member, and minimization of the area of contact is further enabled by fastening the arm portion 54 of the carrier 48 to the yoke 60 above the plate 22 in the manner illustrated.

The narrow and relatively thin configuration of the carriers 48 and blades 74 minimizes the mass and resulting inertia of reciprocating parts, thereby reducing the power requirements for the shear and its level of vibration, while at the same time enhancing safety by enabling a low stall torque characteristic. The relative flexibility or resilient deformability of the blades 74 and their individual mountings permit them to closely follow the contour of the teeth 24,26 independently of one another and to flex and twist as necessary to ride upon the edges thereof in such a manner as to produce a very efficient wiping shear effect.

Moreover, the blades 74 are individually removable with great facility for replacement or sharpening, and their construction makes them inherently inexpensive, both in material costs and in permitting the use of conventional and facile straight edge sharpening techniques. Blades of the sort illustrated can be produced from long lengths of steel strip that have been hollow ground along their edges, and reconditioning of dull blades can readily be accomplished with common household sharpening implements if so desired.

Since it is the bias of the blades 74 which holds them in engagement on the pins 72, to remove a blade it is only necessary to lift the associated carrier 48 slightly to relieve the biasing force. The blade 74 can then be tilted downwardly to disengage the pin 72 from the aperture 80 of the tang 78, enabling ready removal from the slot 64.

Although not illustrated, it should be appreciated that the entire shearing member may be provided by an elongated and flexible blade of appropriate dimensions, and that it is not necessary that the shear employ the carrier/blade assembly type of shearing member shown. Thus, a blade of a length equivalent to the assembly and having appropriate apertures to receive the pivot post 52 and fastener 58 may be substituted, but in such an instance the blade should itself have a decided curvature or bow to ensure that a downward bias is produced at its free end (such a blade curvature may also be desirable in some cases in which an assembly is employed). In addition, this alternative is somewhat less desirable due to the lessened facility with which the blades may be removed and changed.

Although two blades normally will be employed, in some instances three or more blades may be found beneficial albeit with increased weight and power requirements. It should be appreciated that, although the advantages of the invention are most significant when the shear is power driven and that such devices constitute the preferred embodiments hereof, the driving means may simply be a mechanism enabling manual operation of the tool, with the relatively low levels of friction, light weight, and facility of blade replacement being of considerable advantage in such a hand operated shear.

The materials of construction will be readily apparent to those skilled in the art and need not be described in detail herein. However, the blades are produced of hardened steel and may be coated with a synthetic material having a low coefficient of friction such as a polytetrafluoroethylene type of resin to even further reduce friction. As is now conventional in such devices, synthetic plastic construction may be employed for the housing parts and for gears and the like to afford quiet and trouble-free operation over long periods of use, although aluminum and/or other metals may be preferred for certain parts in some instances. Fiber reinforced plastics and the engineering resins such as polyacetals, polyamides, etc. are desirably utilized.

Although the tooth plate and sole plate are shown as separate elements in the attached drawings, it will be appreciated that they may be integrally formed. Similarly, the housing may be configured and formed with the housing block 20 as an integral extension of the body portion 13, convenienty as a clam-shell type of construction for ease of fabrication.

Thus, it can be seen that the present invention provides a novel shear for grass and the like which operates highly efficiently with relatively low power, which employs moving parts that are relatively lightweight and few in number, and which is relatively simple and inexpensive to manufacture. More specifically, the invention provides a novel shear in which frictional resistance and inertia are minimized and in which safety is maximized by virtue of a low stall torque characteristic. The blade elements employed are relatively inexpensive and are readily removed for replacement and reconditioning. The present construction is particularly well suited for use to provide a power driven shear, and particularly one designed for self-contained battery-powered operation.

We claim:
1. In a shear, the combination comprising:
a. a generally planar tooth plate having at one end thereof a multiplicity of tooth formations defining generally U-shaped cutting recesses therebetween;
b. a plurality of shearing members each having a relatively narrow and resiliently deformable blade element extending outwardly along the upper surface of said one end of said tooth plate and having cutting edges extending along both side margins of the outer end portion thereof, each of said shearing members being individually pivotally mounted on said tooth plate inwardly from said one end thereof for movement across one of said cutting recesses, said shearing members extending in spaced relationship from the surface of said tooth plate over substantially the entire length thereof inwardly of the point of pivotal mounting thereof, said outer end portion of said blade element thereof being resiliently biased against said surface of said tooth plate and being oscillatable across the aligned cutting recess with said cutting edges thereof wiping the side edges of the tooth formations defining said recess; and
c. drive means for oscillating said shearing members upon said tooth plate, said shearing members being attached adjacent their inner ends to said drive means at a point spaced above said upper surface of said tooth plate, said drive means tending to elevate said shearing members above said upper surface to minimize the area of contact therebetween and to enhance the shearing effect of said cutting edges of said blade elements, the bias of said shearing members tending to urge said outer end portions of said blade elements thereof through said cutting recesses and causing substantially point contact between said cutting edges and said side edges as said blade elements wipe said tooth formations.

2. The shear of claim 1 wherein said drive means includes an electric motor to render said shear power driven.

3. The shear of claim 2 additionally including a battery to provide energy for said motor.

4. The shear of claim 2 wherein said drive means includes a gear in driven engagement with said motor and having an axially projecting cam element eccentrically disposed on one side thereof, and a cam follower member having a cam surface extending parallel to said cam element for contact therewith and configured to impart oscillatory movement to said follower member upon rotation of said gear with said cam element contacting said cam surface, said shearing members being pivotally connected to said cam follower member and said cam element contacting said cam surface to translate rotary motion of said gear to oscillatory movement of said follower member in a substantially parallel plane, which in turn imparts said oscillation to said shearing members.

5. The shear of claim 4 wherein said follower member has an elongated opening therein providing said cam surface, said opening having its longitudinal axis substantially parallel to the direction of extension of said tooth formations of said tooth plate.

6. The shear of claim 5 wherein said cam element has a generally circular transverse cross sectional configuration, and wherein said opening has substantially rectilinear side margins extending parallel to said longitudinal axis of said opening and spaced therefrom a distance substantially equal to the radius of said cam element.

7. The shear of claim 4 wherein said shearing members are substantially rectilinear and are attached to said cam follower member with a spacing therebetween substantially equal to the distance between said axes of pivotal mounting thereof in said shear, thereby disposing said shearing members in a substantially parallel relationship and constraining them to parallelism during oscillation.

8. The shear of claim 4 wherein said drive means is positioned adjacent the other end of said tooth plate, said cam follower member being positioned adjacent said upper surface of said tooth plate with said shearing members attached thereto adjacent their inner ends and with said gear being positioned above said follower member with said cam element thereof extending downwardly thereto, said motor being positioned with its drive shaft extending downwardly along an axis parallel to that of said gear and having affixed thereon a pinion in meshing engagement therewith.

9. The shear of claim 3 additionally including a housing enclosing said motor and battery, said tooth plate extending outwardly from one end of said housing and said housing having a handle portion extending from the other end thereof in a direction generally opposite to that in which said tooth plate extends.

10. In a shear, the combination comprising:
a. a generally planar tooth plate having at one end thereof a multiplicity of tooth formations defining generally U-shaped cutting recesses therebetween;
b. a plurality of shearing members each comprised of a blade carrier individually pivotally mounted on said tooth plate inwardly from said one end thereof and a relatively narrow and resiliently deformable independent blade element extending outwardly along the upper surface of said one end of said tooth plate and having cutting edges extending along both side margins of the outer end portion thereof, said blade carrier having means thereon adjacent the outer end disengageably mounting said independent blade element with the outer end portion of said blade element being resiliently biased against said surface of said tooth plate, said shearing members being oscillatable about the pivotal mounting of said blade carriers to oscillate said blade elements across the aligned cutting recesses with said cutting edges thereof wiping the side edges of the tooth formations defining said recess; and
c. drive means for oscillating said shearing member upon said tooth plate, the bias of said blade elements tending to urge said outer end portions thereof through said cutting recesses and causing substantially point contact between said cutting edges and said side edges as said blade elements wipe said tooth formations.

11. The shear of claim 10 wherein said shearing members are mounted on said tooth plate to oscillate in a substantially parallel relationship to one another, and wherein the point of pivotal mounting for each of said shearing members is in substantial alignment with the axis of said one cutting recess across which it moves.

12. The shear of claim 10 wherein said blade carrier is elongated, and wherein both said carrier and said blade element are substantially rectilinear, said carrier being mounted upon said tooth plate with the axis thereof substantially parallel to said upper surface of said plate, said mounting means supporting said blade element at an angle to said carrier disposing said blade element downwardly therefrom toward said tooth plate.

13. The shear of claim 12 wherein said one end of said carrier has a slot extending therethrough, a tang portion adajcent one end of said independent blade element being inserted upwardly through said slot and retained therein to so engage and dispose said blade element.

14. The shear of claim 14 wherein said blade element is retained by a pin affixed on one of said carrier and said tang of said blade element, the other of said carrier and tang having said pin securely received in an aperture thereof dimensioned and configured therefor, said pin being disposed with its axis substantially perpendicular to the axis of said blade element and said bias of said shear member urging said pin into said aperture to prevent inadvertent disassembly thereof.

15. In a shear, the combination comprising:
a. a generally planar tooth plate having at one end thereof a multiplicity of tooth formations defining generally U-shaped cutting recesses therebetween;
b. a plurality of shearing members each having a relatively narrow and resiliently deformable blade element extending outwardly along the upper surface of said one end of said tooth plate and having cutting edges extending along both side margins of the outer end portion thereof, each of said shearing members being pivotally mounted in said shear inwardly from said one end of said tooth plate for movement across one of said cutting recesses, said outer end portion of said blade element thereof being resiliently biased against said surface of said tooth plate and being oscillatable across the aligned cutting recess with said cutting edges thereof wiping the side edges of the tooth formations defining said recess;
c. a sole plate element extending the lower surface of said tooth plate substantially across said tooth plate adjacent the inner ends of said tooth formations thereof to space said tooth formations upwardly from surfaces over which the shear is operated and thereby prevent excessive wear and damage to said tooth formations due to contact therewith; and
d. drive means for oscillating said shearing member upon said tooth plate, the bias of said shearing members tending to urge said outer end portions of said blade elements thereof through said cutting recesses and causing substantially point contact between said cutting edges and said side edges as said blade elements wipe said tooth formations.

16. The shear of claim 15 wherein said shearing members are individually mounted.

17. The shear of claim 15 wherein said sole plate element underlies the inner end portions of the recesses between said tooth formations and provides web portions having edge surfaces extending transversely between said tooth formations, said web portions reducing the effective depth of said tooth formations and blade elements exposed for cutting

* * * * *